United States Patent

[11] 3,613,789

| [72] | Inventor | Marion O. Son, Jr.<br>Littleton, Colo. |
|------|----------|---------------------|
| [21] | Appl. No. | 20,102 |
| [22] | Filed | Mar. 16, 1970 |
| [45] | Patented | Oct. 19, 1971 |
| [73] | Assignee | Marathon Oil Company<br>Findlay, Ohio |

[54] METHOD USING MICELLAR DISPERSIONS IN MULTIPLE FRACTURING OF SUBTERRANEAN FORMATIONS
26 Claims, No Drawings

[52] U.S. Cl. .................... 166/281, 166/284
[51] Int. Cl. .................... E21b 33/13, E21b 43/26
[50] Field of Search .................... 166/308, 281, 283, 284

[56] References Cited
UNITED STATES PATENTS

| 2,788,072 | 4/1957 | Goodwin | 166/281 |
|---|---|---|---|
| 2,838,116 | 6/1958 | Clark, Jr. et al. | 166/281 X |
| 3,028,914 | 4/1962 | Flickinger | 166/308 X |
| 3,330,343 | 7/1967 | Tosch et al. | 166/274 X |
| 3,353,604 | 11/1967 | Gibson et al. | 166/281 X |
| 3,356,138 | 12/1967 | Davis, Jr. et al. | 166/274 |
| 3,378,074 | 4/1968 | Kiel | 166/308 |
| 3,460,622 | 8/1969 | Davis, Jr. | 166/308 X |
| 3,493,051 | 2/1970 | Gogarty | 166/275 X |
| 3,500,929 | 3/1970 | Eilers et al. | 166/308 X |
| 3,500,932 | 3/1970 | Webb | 166/308 |

*Primary Examiner*—Stephen J. Novosad
*Attorneys*—Joseph C. Herring, Richard C. Willson, Jr. and Jack L. Hummel

ABSTRACT: A subterranean formation is fractured by injecting under fracturing pressures a micellar dispersion comprised of hydrocarbon, aqueous medium, and surfactant. Propping agents are useful in the dispersion. The viscosity of the dispersion can be designed to obtain "low bleedoff rates" and retard settling of the propping agents. Additional, distinct fractures are obtained by sealing off previously formed fracture(s) with a diverting agent and then injecting again at fracturing pressures the micellar dispersion.

METHOD USING MICELLAR DISPERSIONS IN MULTIPLE FRACTURING OF SUBTERRANEAN FORMATIONS

CROSS-REFERENCE TO RELATED APPLICATION

U.S. Pat. application, Ser. No. 762,141, filed Sept. 24, 1968, now U.S. Pat. No. 3,500,932 teaches the injection of a micellar dispersion into a formation to clean the perforations, formation, etc., previous to the injection of a fracturing fluid.

BACKGROUND OF THE INVENTION

1. Field of the Invention

This invention relates to the hydraulic fracturing of subterranean hydrocarbon-bearing formations penetrated by a well, and particularly to a multiple fracturing technique. Micellar dispersion is the fracturing fluid and it can contain propping agents. Diverting agents are injected after each fracturing step. 2. Description of the Prior Art Hydrocarbon-bearing subterranean formations often are contaminated with cement, drilling mud, foreign particles, contain emulsion blocks, etc., or otherwise lack natural formation pressure. Such can adversely affect the production of hydrocarbon from the formation. One way of overcoming these adversities is to fracture the formation, preferably in a plurality of locations, to facilitate the movement of hydrocarbons via permeable channels which are formed and which extend from the formation to the well bore.

U.S. Pat. No. 3,378,074 to Kiel teaches the use of water-in-oil emulsions as fracturing agents and the use of a wetting agent to reduce friction between the injection string surface and fracturing agent.

U.S. Pat. No. 2,838,116 to Clark et al. teaches the production of multiple fractures in formations by a process of alternately fracturing and then sealing the fracture and then repeating the steps until the desired number of fractures have been produced.

A problem attending traditional fracturing processes lies in the instability of the particular fracturing agent employed. Conventional fracturing agents, such as emulsions, must be substantially more viscous than water for most reservoirs before fractures can be obtained at reasonable injection pressures. Oftentimes, necessary fracturing pressures and rates tend to lower the viscosity of the fracturing pressures and rates tend to lower the viscosity of the fracturing agent by shearing, emulsion breakdown, etc. These fracturing agents also tend to break down or otherwise suffer a decrease in viscosity when transported to the well site. As a result, production of the fracturing agent at the well site has been necessitated. Furthermore, storage of these fracturing fluids, whether at the well site, or elsewhere, has resulted in their breakdown due to their inherent instability.

These and other disadvantages of the prior art are overcome by utilizing the novel fracturing agent and processes for its implementation according to the present invention.

SUMMARY OF THE INVENTION

Briefly described, the invention comprises a process for hydraulically fracturing, at a multiplicity of locations, a subterranean hydrocarbon-bearing formation penetrated by at least one well. The novel fracturing agent is a micellar dispersion comprised of hydrocarbon, aqueous media and surfactant (preferably petroleum sulfonate) and having a viscosity of at least about 10 cp. at ambient temperature (i.e., about 22°–23° C.). The fracturing agent is conventionally injected into the formation under sufficient pressure to fracture the formation. A lubricating fluid to wet the inner surface of the injection tubing can be used where the viscosity of the micellar dispersion is high, e.g., 1,000 cp. The resulting fracture increases the permeability of the formation in the vicinity of the well bore. Propping agents may be incorporated in the fracturing fluid to hold open the fractures. Additional distinct fractures are obtained by sealing off the previously formed fracture with a diverting agent, herein defined, and then injecting micellar dispersion under fracturing pressures. The diverting agent is later dissolved or otherwise removed to allow recovery of hydrocarbons in a producing well, or to permit higher injection rates in an injection well. A uniform fracturing profile may be obtained by continuing the process until the desired number of fractures have been produced.

DESCRIPTION OF PREFERRED EMBODIMENTS OF INVENTION

The term "micellar dispersion" as used herein is meant to include micellar solutions, "microemulsions," "transparent" emulsions, etc. Examples of useful micellar dispersions are included in U.S. Pat. Nos. 3,254,714; 3,275,075; 3,301,325; 3,307,628; 3,330,344; 3,348,611 and 3,497,006. The micellar dispersion can be oil-external, or water-external, but preferably is oil-external.

The micellar dispersion is, for purposes of this invention, a relatively stable dispersion. By stable is meant that the dispersions are thermodynamically stable, appearing to be single phased and substantially transparent. Equilibrium tends toward further dispersion of the internal phase rather than coagulation or coalescence, the latter being characteristic of emulsions.

The micellar dispersion is comprised of hydrocarbon, aqueous medium, and at least one surfactant. One or more cosurfactants (also identified as cosolvents, cosolubilizers, and semipolar organic compounds) are useful, but not necessary, in the dispersions. Also, the micellar dispersion can contain other additives, e.g., corrosion and scale inhibitors, bactericides, etc. Examples of useful dispersions include those containing, by volume, about 4 percent to about 90 percent hydrocarbon; about 1 to about 90 percent water, at least about 4 percent surfactant, about 0.01 to about 20 percent or more of cosurfactant and about 0.001 or less to about 5 percent or more by weight of electrolyte.

Examples of useful hydrocarbons include crude oil, partially refined fractions thereof, e.g., side cuts from crude columns, crude column overheads, gas oils, kerosene, heavy naphthas, naphthas, straight-run gasoline, and liquefied petroleum gases, refined fractions of crude oil and halogenated hydrocarbons. Pure hydrocarbons are also useful, e.g., paraffinic compounds including liquefied petroleum gases, propane, pentane, heptane, decane, dodecane, etc.; cycloparaffin compounds including cyclohexane, etc.; aryl compounds including monocyclic and polycyclic and substituted products thereof including toluene, alkyl phenols, etc., combinations of the hydrocarbons taught herein and like materials. Halogenated hydrocarbons are also useful. Based on economic considerations, the preferred hydrocarbon is a locally available crude oil. The unsulfonated hydrocarbon (e.g., heavy vacuum gas oils) in petroleum sulfonates is also useful.

The aqueous medium can be soft, brackish, or brine water. Preferably, the water is soft but it can contain small amounts of salts. The salts are preferably compatible with the ions within the subterranean formation.

Examples of useful surfactants include those found in U.S. Pat. No. 3,254,714 to Gogarty et al. Preferably, the surfactant is a petroleum sulfonate, also known as alkaryl sulfonates or alkaryl naphthenic sulfonates. The sulfonate can contain less than 60 and up to 100 percent active sulfonate. Examples of preferred surfactants are the sodium and ammonium petroleum sulfonates. The sulfonate can have an average equivalent weight within the range of about 350 to about 520, and more preferably about 390 to about 470. The surfactant can be a mixture of low, medium and high average equivalent weight sulfonates or a mixture of different surfactants. Equivalent weight is defined as the molecular weight divided by the number of sulfonate groups per molecule of sulfonate.

Examples of useful cosurfactants include alcohols, nitrogen containing compounds such as amides and amino compounds, esters, aldehydes, ketones, ethers and like compounds containing one up to about 20 or more carbon atoms and more preferably about three to about 16 carbon atoms. Combinations of hydroxy, aldehyde, ester, ether, and nitrogen grouping on the same molecule are also useful. The cosurfactant is preferably a hydroxy containing compound, e.g., isopropanol, n— and isobutanol, the amyl alcohols such as n-amyl alcohol, 1— and 2—hexanol, 1— and 2—octanol, decyl alcohols, alkaryl alcohols such as p-nonyl phenol, alcoholic liquors such as fusel oil, hydroxy compounds such as 2—butoxyethanol and like compounds. Particularly useful alcohols include the primary butanols, primary pentanols and secondary hexanols. Concentrations of about 0.1 percent to more than about 10 percent by volume are preferred and more preferably from about 0.2 percent to about 5 percent. Mixtures of two or more cosurfactants are also useful.

Electrolytes useful within the micellar dispersions include inorganic gases, inorganic acids, inorganic salts, organic bases, organic acids, and organic salts. The electrolytes can be strongly or weakly ionized. Preferably, the electrolytes are inorganic bases, inorganic acids, and inorganic salts, examples include sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in U.S. Pat. No. 3,330,344. The type and concentration of preferred electrolyte will depend on the hydrocarbon phase, aqueous phase, surfactant, cosurfactant, operating conditions, (e.g., temperature) compatability with the propping agents and ions within the formation, etc.

The components of the micellar dispersion are admixed with agitation in any suitable manner, such as by stirring, shaking, rotary stirring, or pumping to form a stable micellar dispersion. This micellar dispersion may be prepared at the well site, or elsewhere. The dispersion can be designed not to phase separate upon storage under wide temperature fluctuations, e.g., see U.S. Pat. Nos. 3,493,047 to Davis et al.; 3,493,048 to Jones, and U.S. Ser. No. 754,524 to Davis et al., filed July 22, 1968, and now U.S. Pat. No. 3,500,912.

The viscosity of the micellar dispersion fracturing agent may be varied over a wide range. The desired viscosity is selected by considering the particular well and formation to be treated. Important considerations include permeability of the formation, presence or absence of interstitial water, availability of natural brine to use as the aqueous component of the fracturing agent, diameter and friction properties of the injection string, etc. Generally, the viscosity of the fracturing agent should vary directly with the permeability of the formation; thus, for highly permeable formations, a high viscosity fracturing fluid is generally necessary to produce sizeable fractures. Also, the viscosity should be sufficient to retard settling of the propping agent within the micellar dispersion.

The characteristics of the micellar dispersion, especially viscosity, may be tailored to fit the particular reservoir. The viscosity of the fracturing agent may also be monitored at the surface to account for any in situ reservoir changes which would require a redesigning of the micellar dispersion. Viscosity control in general, is obtained by varying a number of parameters, including water concentration, particular hydrocarbon, particular surfactant, cosurfactant (if any), electrolyte (if any), and control of the hydrophile lipophile balance (HLB).

One of the most important parameters for control of viscosity is the aqueous medium concentration of the micellar dispersion. For preferred viscosities of at least 10 cp., and preferably in the range of from about 100 to about 2,000 cp., depending on the characteristics of the reservoir, the water concentration is preferably about 1 to about 50 and more preferably about 2 to about 25 percent by volume. The general shape of the curve defining the relationship between viscosity and water concentration for a particular micellar dispersion is depicted in the drawing of U.S. Pat. No. 3,254,714 to Gogarty. This curve demonstrates that the viscosity can go to a maximum at a relatively low concentration of water. At or near this low water concentration, the viscosity of the fracturing agent may be varied within a wide degree by merely monitoring the water concentration within a relatively small range of concentrations. However, the curve may be shifted with respect to the horizontal and/or vertical axis and also varied somewhat in shape depending on the particular system involved. Factors which affect the disposition of the curve (and hence properties of the system) include molecular weight of surfactants, type of hydrocarbon, type and amount of cosurfactant and/or electrolyte.

Any of a number of commonly employed propping agents may be incorporated with the fracturing fluid and injected into the formation. The higher the viscosity of the fracturing agent, the greater its capacity to carry larger and heavier propping material. Propping agents useful for the present invention include coarse sand grains, tempered glass beads, rounded walnut shell fragments, aluminum pellets, and similar materials. Such agents are generally used in concentrations between about 0.1 and about 5.0 and preferably about 0.5 and about 3.5 lbs/gallon of fracturing fluid. In general, those propping agents with average particle sizes of about 6 to about 400 mesh, preferably about 10 to about 100 and more preferably about 10 to about 20 mesh are employed. However, the desired size will depend on the particular reservoir to be fractured, etc.

One advantage contemplated by the invention is that friction between the injection string and the fracturing fluid (with or without propping agent) will be relatively low, with the result that it is not normally necessary to lubricate the injection string to permit greater injection rates. The micellar dispersions of the present invention tend to be self-lubricating. However, it may be desirable in certain cases, especially where extremely high viscosity fluids are to be injected, to coat the injecting string with a material compatible with the micellar dispersion. When the micellar dispersions are oil-external systems, the lubricating fluid is preferably one which is predominantly miscible with the hydrocarbon phase of the miscellar dispersion. Examples of useful lubricating fluids include those hydrocarbons described hereinabove as examples of components of the micellar dispersion. More preferably, aqueous polymer solutions, exemplified by aqueous solutions of partially hydrolyzed, high molecular weight polyacrylamides, polysaccharides, polyethylene oxides, carboxy methyl cellulose, carboxy vinyl polymers, and solutions of like materials are employed.

Prefracturing agents may be injected into the reservoir ahead of the micellar dispersion, such as acids or surfactant solutions, although in general the fracturing agents of the present invention tend to self-clean the well bore and formation.

The rates of injection of fracturing agent should be sufficiently high to increase the pressure above the fracturing pressure (overburden pressure). These rates will depend upon downhole pressure, permeability of the formation, width of the formation, etc. For most reservoirs, any rate of injection will be sufficient if such imparts a downhole pressure between about 500 and about 5,000 p.s.i. In general, the fractures will extend radially at least 10 feet, preferably at least 15 feet from the well bore into the formation.

Once the first fracture has been established, diverting agent is introduced into the formation and displaced into a portion of the fracture. The diverting agent seals or bridges the fracture so that upon reapplication of hydraulic fracturing pressure (i.e., by pumping fracturing agent) the old fracture is essentially shielded from this applied pressure, and a new distinct fracture is created within the formation. This process of intermittently fracturing, then sealing the thus formed fracture with diverting agent is repeated until the desired fracture profile and number of fractures has been obtained.

Examples of diverting agents include the following:

(1) fibrous—pliable, stringy materials which tend to entangle or mat in or over a crevice; (2) granular—angular, rigid materials which tend to bridge against each other in a crevice without being distorted appreciable, (3) lamellated—materials formed of thin sheets or flakes, etc. The size of the particles of diverting agent preferably vary over a wide range so that an impermeable bridge rather than a filter is formed. Particles, particularly granular particles between about 2½ and about 200 mesh U.S. sieve, may be used, with preferably about one-half in the range of about 4–10 mesh, the other half in the range of about 10–100 mesh.

Fluid communication between the sealed fractures and well bore is resumed by removing the diverting agents. Thus, the diverting agents are of a transient nature and may be desirably removed from the fractures, for example, by application of heat, dissolution by a solvent, or by the action of formation fluids. Examples of such solvents include organic and inorganic acids, organic and inorganic bases, petroleum solvents such as hexane, benzene, and halogenated solvents such as ethylene dichloride and trichlorethane, etc., surfactants including oil-soluble amines, e.g., dibutylamine, etc.

Preferred diverting agents include rock salt, a number of the harder waxes such as flaked or granulated beeswax, carnauba wax, microcrystalline hydrocarbon wax, and other known natural and synthetic polymers useful as diverting agents. Various thermoplastic materials are suitable, as well as fats and hardened oils exemplified by hydrogenated oils including animal oils, soybean oil, cottonseed oil and like oils. Polycyclic aromatic compounds, especially coal tar derivatives are also contemplated. Examples include naphthalene and anthracene, which are solid at atmospheric temperatures and are soluble in formation fluids, such as crude oil and methane. Naphthalene is most preferred. Preferably, the diverting agent has a melting point above about the temperature of the formation.

The diverting agents are preferably dispersed or slurried in a carrier liquid. The carrier liquid is preferably similar or identical to the fracturing agent, i.e., a micellar dispersion. In general, the carrier liquid should be able to substantially support the diverting agent with a minimum of settling or other separation. The carrier may be aqueous or nonaqueous, but is preferably compatible with formation fluids. Examples include water, micellar dispersions, partially refined fractions of crude oils such as heavy fuel oil, gasoline, kerosene, or the like, crude oil and like materials. Viscosity enhancing or gelling agents may be employed in the carrier, exemplified by metallic soaps and high-molecular weight polymers, e.g., polypropylene, aqueous solutions of partially hydrolyzed, high-molecular weight polyacrylamides, polysaccharides, polyethylene oxides, carbon methyl cellulose, carboxy vinyl polymers, polybutylenes, and like materials.

The concentration of diverting agent may vary widely, but for naphthalene it preferably varies about 50 to about 300, more preferably about 100 to about 200 pounds of naphthalene per barrel of carrier liquid. Usually about ½ to about 2 barrels of this slurry will seal a fracture, although an excess of up to about 10 barrels is preferably injected to seal the first fracture.

In the case where the formation to be fractured is penetrated by a well having a casing with perforations allowing communication between the well bore and formation, diverting agents such as "sealer balls" may be employed to selectively divert the locus of fracturing pressure stresses to desired portions of the formation. The sealer balls can be made of nylon, rubber, rubber coated balls, neoprene, plastic or like materials. Any material is useful as long as it will conform substantially to the shape of the perforations and seal that portion of the formation. The sealer ball should have a diameter at least about equal to and preferably greater than the average diameter of perforations within the casing. Also, it is preferred that the diameter and material of the sealer ball be such that the sealer ball will become readily dislodged upon returning the well to production. A preferred sealer ball is one that is rubber coated. The total number of sealer balls injected depend on the degree of differing permeabilities, the number of perforations, etc. Generally, the number of sealer balls can be at least about 75 percent of the number of perforations.

The alternate injection of fracturing fluid and fracture-diverting agent which seals any fracture created by that fracturing liquid can be continued until the number of fractures or fracture profile desired in the formation has been obtained. The last injection of slug of micellar dispersion fracturing agent can be followed either directly or indirectly by a peptizer or solvent which can reduce the viscosity and/or gel strength of the fracturing fluid and dissolves the diverting agent. As defined previously, preferred solvents include the organic and inorganic acids, organic and inorganic bases, petroleum solvents, surfactants and like materials. Natural formation fluids may alone be sufficient over a period of time to dissolve (or sufficiently reduce the viscosity of) the sealants and permit hydrocarbon to flow into the well or higher injection rates into injection wells. Certain useful peptizers include aluminum soap-hydrocarbon gels, water and lower alcohols, e.g., methanol and isopropyl alcohol, or a ketone, such as acetone.

The following examples specifically illustrate micellar dispersions useful with this invention. Unless otherwise specified, all percents are based on volume. The viscosities of the micellar dispersions are measured at 72° F. on a Brookfield Viscometer. These micellar dispersions are obtained by mixing the surfactant and hydrocarbon and then adding water to obtain the indicated viscosities. Compositions of the micellar dispersions are indicated in table I:

TABLE I

| Sample No. | Composition of Micellar Dispersion | Viscosity (cp) at 72° F. |
|---|---|---|
| A | 7.5 g. of Shell sulfonate<br>2.5 g. of Pyronate 50<br>96 ml. hydrocarbon (SRG+VO)<br>25 ml. distilled water | 88.5 |
| B | 7.5 g. Petronate K<br>2.5 g. Pyronate 50<br>96 ml. hydrocarbon (SRG+VO)<br>25 ml. distilled water | 170 |
| C | 7 g. Shell sulfonate<br>3 g. Pyronate 50<br>96 ml. hydrocarbon (SRG+VO)<br>25 ml. distilled water | 198 |
| D | 7 g. Petronate K<br>3 g. Pyronate 50<br>96 ml. hydrocarbon (SRG+VO)<br>25 ml. distilled water | 400 |
| E | 5.5 g. Shell sulfonate<br>4.5 g. Pyronate 50<br>96 ml. hydrocarbon (SRG+VO)<br>25 ml. distilled water | Greater than 2,000 |
| F | 10 g. Pyronate 50<br>96 ml. hydrocarbon (SRG+VO)<br>25 ml. distilled water | "gel" |

Note:
1. Shell sulfonate, sodium petroleum sulfonate, marketed by Shell Chemical Co., 100 percent active, since VO has been extracted, average equivalent weight 460–465;
2. Pyronate 50, sodium petroleum sulfonate, marketed by Sonneborn Chemical Co., New York, N.Y., 50 percent active sulfonate, average equivalent weight 360;
3. SRG is straight run gasoline;
4. VO is vehicle oil obtained from the Shell sulfonate;
5. Petronate K, sodium petroleum sulfonate, marketed by Sonneborn Chemical Co., New York, N.Y. 62 percent active sulfonate, average equivalent weight 420–450.

The invention is not intended to be limited by the foregoing description. Rather, all modifications and equivalents obvious to those skilled in the art are intended to be equated with the scope of the invention as taught within the specification and appended claims.

What is claimed is:

1. A process of producing hydraulically a plurality of fractures in a subterranean hydrocarbon-bearing formation penetrated by at least one well comprising
    a. injecting into the formation, at a pressure sufficient to fracture the formation, a micellar dispersion comprised of hydrocarbon, aqueous medium and surfactant having a viscosity of at least about 10 centipoises at ambient temperature, thereby fracturing said formation to produce a first fracture,
    b. introducing into the formation a diverting agent capable of substantially sealing the first fracture,
    c. injecting additional micellar dispersion at a pressure sufficient to create a second fracture in the formation distinct from the first fracture, and thereafter
    d. creating a plurality of fractures.

2. The process of claim 1 wherein after step "c," steps "b" and "c" are repeated to create a third fracture in the formation.

3. The process of claim 1 wherein steps "b" and "c" are repeated more than once to create a plurality of fractures in the formation.

4. The process of claim 1 wherein propping agent is incorporated within the micellar dispersion.

5. The process of claim 4 wherein the viscosity of the micellar dispersion is sufficient to substantially retard the settling of the propping agent.

6. The process of claim 1 wherein the viscosity of the micellar dispersion is regulated by varying the relative concentration and/or selection of hydrocarbon, aqueous medium or surfactant employed.

7. The process of claim 1 wherein the injection pressure is within the range of about 500 to about 5,000 p.s.i.

8. The process of claim 1 wherein the surfactant is petroleum sulfonate having an average equivalent weight of about 350 to about 520.

9. The process of claim 1 wherein the diverting agent is incorporated in a carrier fluid compatible with formation fluids within the subterranean formation.

10. The process of claim 1 wherein the diverting agent has an average melting point above about the temperature of the formation.

11. The process of claim 1 wherein the diverting agent is soluble in the fluids within the formation.

12. The process of claim 1 wherein the diverting agent is selected from the group consisting of rock salt, hard wax, fats, hardened oils, substantially solid coal tar derivatives, synthetic polymers and mixtures of same.

13. The process of claim 1 wherein the formation to be fractured surrounds a pipe casing containing a number of perforations providing communication between the well and the formation and wherein the diverting agents are sealer balls having an average diameter at least about as great as the average diameter of the perforations in the casing.

14. The process of claim 13 wherein the sealer balls are comprised of nylon, rubber and/or plastic.

15. A process of producing hydraulically a plurality of fractures in a subterranean hydrocarbon-bearing formation penetrated by at least one well comprising
    a. injecting into the formation, at a pressure sufficient to fracture the formation, a micellar dispersion comprised of hydrocarbon, aqueous medium, and petroleum sulfonate and having a viscosity of at least about 10 centipoises at ambient temperature, thereby fracturing said formation,
    b. introducing into the formation a carrier fluid containing a diverting agent capable of substantially sealing the fracture previously produced,
    c. injecting additional micellar dispersion at a pressure sufficient to create additional fracture(s) in the formation distinct from the previous fracture(s),
    d. repeating at least once steps b and c until the desired number of fractures have been created in the formation.

16. The process of claim 15 wherein the diverting agents are removed either by dissolving action of formation fluids or by introducing into the formation a peptizer or solvent which substantially opens the fractures previously sealed.

17. The process of claim 15 wherein the carrier fluid is substantially miscible with formation fluids.

18. The process of claim 15 wherein the carrier fluid is comprised of micellar dispersion.

19. The process of claim 15 wherein the formation to be fractured surrounds a pipe casing containing perforations providing communication between the well and the subterranean formation and wherein the diverting agents are sealer balls selected from the group consisting of nylon, rubber, rubber-coated balls, and plastic balls, which balls have an average diameter at least about as large as the average diameter of the perforations of the well casing.

20. The process of claim 15 wherein the peptizer or solvent is selected from the group consisting of inorganic bases, inorganic acids, organic bases, organic acids, ketones, surfactants, petroleum solvents, and diluted forms thereof.

21. The process of claim 15 wherein propping agent is incorporated into the micellar dispersion.

22. The process of claim 21 wherein the micellar dispersion has sufficient viscosity to substantially retard settling of the propping agent.

23. The process of claim 15 wherein the diverting agent is selected from fibrous, granular, natural polymers, synthetic polymers, lamellated materials, and combinations of same.

24. The process of claim 23 wherein the melting point of the diverting agent is above about the temperature of the formation.

25. The process of claim 23 wherein the diverting agent is soluble in the fluids of the formation.

26. The process of claim 23 wherein the diverting agent is a coal tar derivative.

UNITED STATES PATENT OFFICE
CERTIFICATE OF CORRECTION

Patent No. 3,613,789          Dated  10/19/71

Inventor(s)          Marion O. Son, Jr.

It is certified that error appears in the above-identified patent and that said Letters Patent are hereby corrected as shown below:

Col. 1, line 44:          Delete entire line (duplicate).

Col. 2, line 30:          After "dispersions" insert
                          --Also, electrolytes are useful
                          in the dispersions.--.

Col. 3, line 16:          Delete "gases," and insert
                          --bases,--.

Col. 4, line 75:          Delete "appreciable" and
                          insert --appreciably--.

Signed and sealed this 4th day of April 1972.

(SEAL)
Attest:

EDWARD M. FLETCHER, JR.                ROBERT GOTTSCHALK
Attesting Officer                      Commissioner of Patents